(12) United States Patent
Walker et al.

(10) Patent No.: US 7,658,674 B2
(45) Date of Patent: *Feb. 9, 2010

(54) METHODS AND APPARATUS FOR FACILITATING INTERACTION WITH A GAMING DEVICE

(75) Inventors: Jay S. Walker, Ridgefield, CT (US); James A. Jorasch, New York, NY (US); Thomas M. Sparico, Hoboken, NJ (US); Stephen C. Tulley, Fairfield, CT (US); Michael D. Downs, Stamford, CT (US)

(73) Assignee: IGT, Reno, NV (US)

( * ) Notice: Subject to any disclaimer, the term of this patent is extended or adjusted under 35 U.S.C. 154(b) by 457 days.

This patent is subject to a terminal disclaimer.

(21) Appl. No.: 11/423,267

(22) Filed: Jun. 9, 2006

(65) Prior Publication Data

US 2006/0224258 A1     Oct. 5, 2006

Related U.S. Application Data

(63) Continuation of application No. 11/026,222, filed on Dec. 30, 2004, now Pat. No. 7,485,040, which is a continuation-in-part of application No. 10/112,712, filed on Mar. 29, 2002, now Pat. No. 6,890,256, which is a continuation-in-part of application No. 09/521,869, filed on Mar. 8, 2000, now Pat. No. 6,390,917, which is a continuation of application No. 08/769,085, filed on Dec. 18, 1996, now Pat. No. 6,186,893.

(51) Int. Cl.
    *A63F 13/00* (2006.01)
(52) U.S. Cl. ........................................ 463/25
(58) Field of Classification Search .................. 463/25, 463/42
    See application file for complete search history.

(56) References Cited

U.S. PATENT DOCUMENTS

| 5,488,411 | A | * | 1/1996 | Lewis | 725/83 |
| 5,697,844 | A | * | 12/1997 | Von Kohorn | 463/40 |
| 5,759,101 | A | * | 6/1998 | Von Kohorn | 463/40 |
| 2002/0107073 | A1 | * | 8/2002 | Binney | 463/42 |
| 2003/0027629 | A1 | * | 2/2003 | Pimienta | 463/25 |
| 2003/0060247 | A1 | * | 3/2003 | Goldberg et al. | 463/1 |
| 2007/0202951 | A1 | * | 8/2007 | Bogosian et al. | 463/42 |

* cited by examiner

*Primary Examiner*—Peter Dungba Vo
*Assistant Examiner*—Masud Ahmed
(74) *Attorney, Agent, or Firm*—K&L Gates LLP

(57) ABSTRACT

In accordance with one embodiment of the present invention, a method provides for determining data associated with a player of a gaming device; determining whether the data meets at least one established criterion; and providing an offer to the player if the data meets the at least one established criterion, the offer including a condition and a description of a product to be provided to the player in exchange for the player agreeing to the condition.

20 Claims, 9 Drawing Sheets

| PRODUCT ID NUMBER 46A | PRICE 46B | PRODUCT DESCRIPTION 46C | QUANTITY REMAINING 46D |
|---|---|---|---|
| | | | |
| | | | |
| | | | |

FIG. 4

| ADVERTISEMENT ID NUMBER 48A | AUDIO / VIDEO OF ADVERTISEMENT 48B | CRITERIA 48C | NUMBER OF TIMES DISPLAYED 48D | NUMBER OF PURCHASES 48E | PRODUCT ID NUMBER 48F |
|---|---|---|---|---|---|
| | | | | | |
| | | | | | |
| | | | | | |

FIG. 5

| PLAYER ID: P1 | | | | | |
|---|---|---|---|---|---|
| OFFER INSTANCE ID 120A | ADVERTISEMENT ID 120B | PLAYER RESPONSE 120C | RESPONSE TIME/DATE 120D | BALANCE ADJUSTMENT AMOUNT 120E | PAYMENT AMOUNT 120F |
| | | | | | |
| | | | | | |
| | | | | | |

120

FIG. 8B

METHODS AND APPARATUS FOR FACILITATING INTERACTION WITH A GAMING DEVICE

CROSS-REFERENCE TO RELATED APPLICATIONS

This application is a continuation of U.S. patent application Ser. No. 11/026,222, filed on Dec. 30, 2004 now U.S. Pat. No. 7,485,040; which is a continuation-in-part of U.S. patent application Ser. No. 10/112,712, filed on Mar. 29, 2002 now U.S.Pat. No. 6,890,256; which is a continuation-in-part of U.S. patent application Ser. No. 09/521,869, filed on Mar. 8, 2000 now U.S. Pat. No. 6,390,917, incorporated herein by reference; which is a continuation of U.S. patent application Ser. No. 08/769,085, filed on Dec. 18, 1996 and issued Feb. 13, 2001 as U.S. patent application Ser. No. 6,186,893, incorporated herein by reference.

BRIEF DESCRIPTION OF THE DRAWINGS

FIG. 4 is a schematic diagram of a product database consistent with one or more embodiments of the present invention.

FIG. 5 is a schematic diagram of an advertising database consistent with one or more embodiments of the present invention.

FIG. 8B is a schematic diagram of an alternative embodiment of an offer status database consistent with one or more embodiments of the present invention.

DETAILED DESCRIPTION OF EMBODIMENTS

Figure 1:
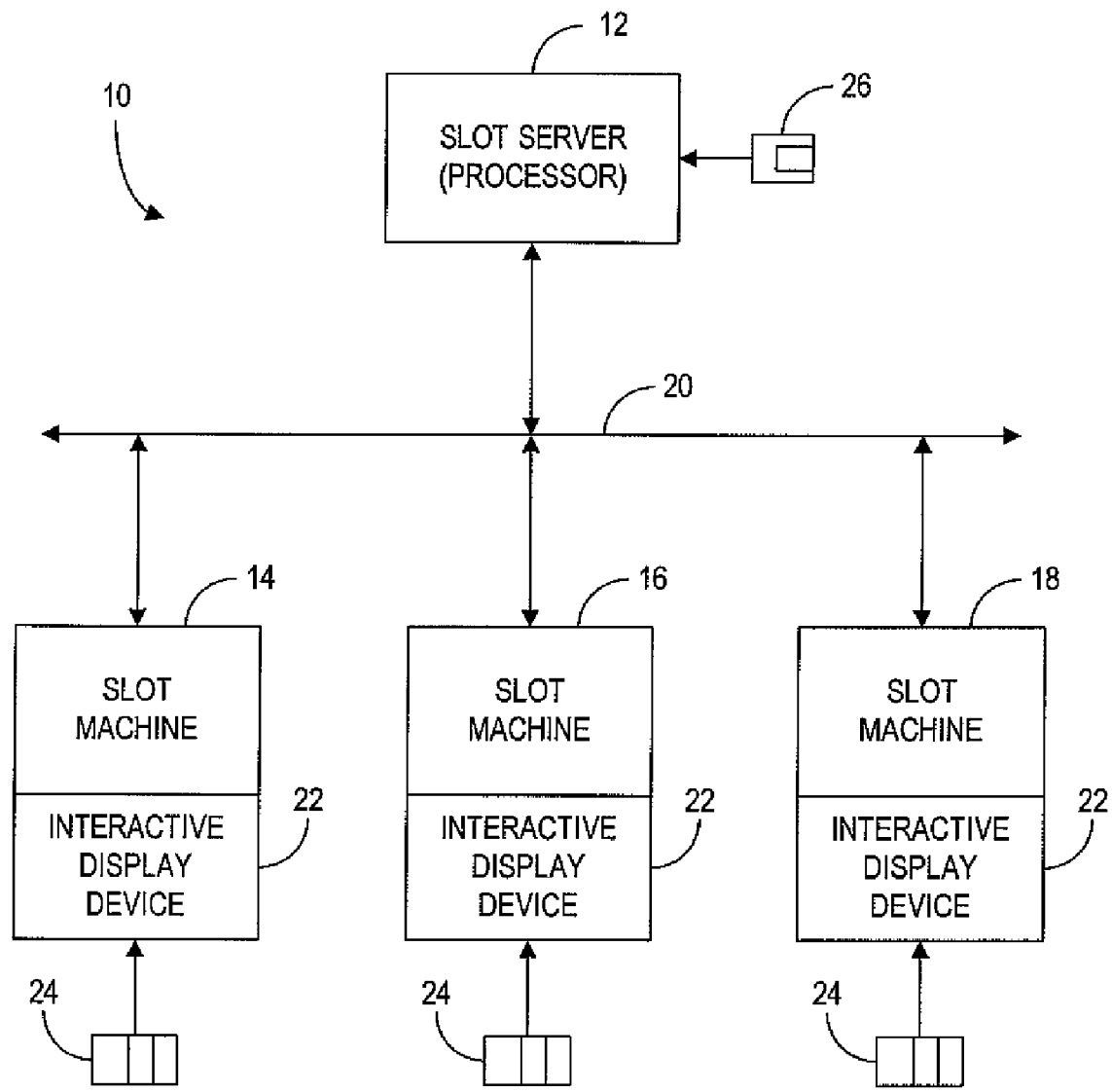
FIG. 1 is a block diagram of a network consistent with one or more embodiments of the present invention.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The term "plurality" means "two or more," unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing instructions that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable-media may be involved in carrying a sequence of instructions to a processor.

Various embodiments of the present invention are described herein with reference to the accompanying drawings. The leftmost digit(s) of a reference numeral typically identifies the figure in which the reference numeral first appears.

As will be understood by those skilled in the art, the drawings and accompanying descriptions presented herein indicate some exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Referring to FIG. 1, a network 10 consistent with some embodiments of the present invention includes a network server 12, which is connected to a plurality of slot machines 14, 16, and 18, via a bus system 20. Each of slot machines 14, 16, and 18 includes an interactive display device 22, which is adapted to display messages that are either downloaded from network server 12 or are generated locally in the respective slot machine. The slot machines may alternatively be connected to server 12 through any appropriate network configuration (e.g., a wireless network).

Note that while only slot machines are indicated in FIG. 1 as being connected to bus system 20, various gaming devices which provide intermittent payouts to a player in response to continued play actions (e.g., reel slot machines, video slot machines, keno devices, bingo devices, video poker devices, video blackjack devices) can be controlled by network server 12 in the same manner. Thus, while the description hereafter will consider "slot machines", it is to be understood that various types of gaming devices are also to be considered within the scope of the invention.

Each interactive display device 22 is provided with means for receiving a player-identity card 24 that typically includes player information, e.g., identity of the player, and may also include further data such as an amount of a line of credit available to the player, an amount of remaining credit available, and player status information (i.e., frequent player, infrequent player, heavy bettor). Each interactive display device 22 further includes key entry inputs (either soft or hard keys) that are made available for use by the player.

Network server 12 includes a transaction processor subroutine which is stored therein or which can be loaded thereinto via a magnetic disk 26. The transaction processor subroutine, in combination with the network server hardware, provides accounting and statistical services for connected slot machines, control and updating of connected databases, and provision of product and product purchase information to the slot machines. The transaction processor subroutine further processes input signals from the players at the respective slot machines.

Figure 2:
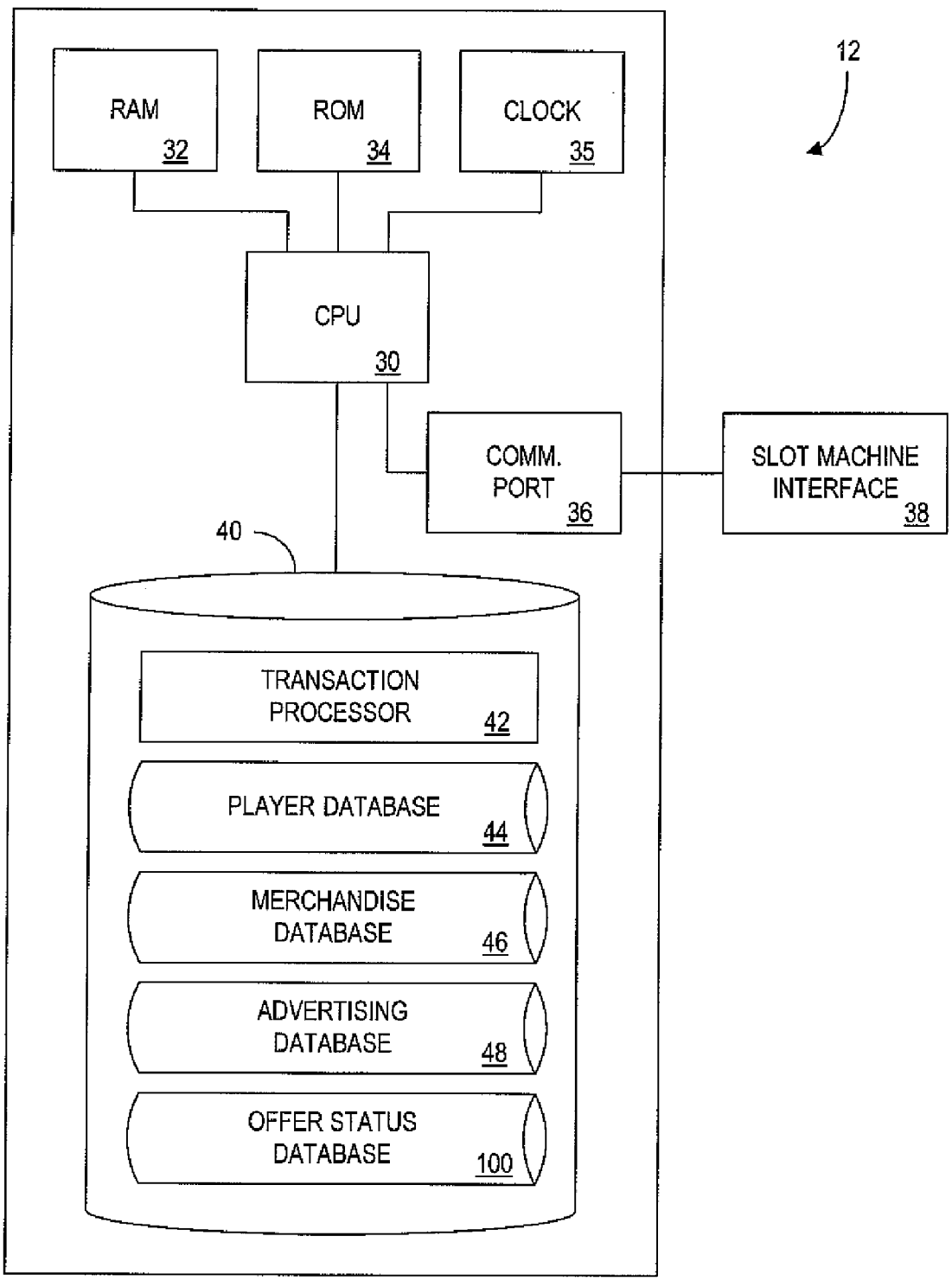
FIG. 2 is a high-level block diagram of a network server consistent with one or more embodiments of the present invention.

FIG. 2 illustrates a block diagram of a representative network server 12 consistent with some embodiments of the present invention. Network server 12 includes a central processor unit (CPU) 30 which is coupled to a random access memory (RAM) 32, a read only memory (ROM) 34, a clock 35, and a communication port 36 which provides interconnection to bus system 20 (via slot machine interface 38). A data storage device 40 provides memory capacity for a transaction processor subroutine 42, a player database 44, a product database 46, an advertising database 48, and an offer status database 100.

The data storage device 40 (or any other memory or data storage device described herein) may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The CPU 30 and the data storage device 40 may each be, for example: (i) located entirely within a single computer or other device; or (ii) connected to each other by a remote communication medium, such as a serial port cable, telephone line or radio frequency transceiver. In one embodiment, the network server 12 may comprise one or more devices that are connected to a remote server computer for maintaining databases.

The data storage device 40 stores a transaction processor subroutine 42 for controlling the CPU 30. The CPU 30 performs instructions of the transaction processor subroutine 42, and thereby operates in accordance with the present invention, and particularly in accordance with the methods described in detail herein. The transaction processor subroutine 42 may be stored in a compressed, uncompiled and/or encrypted format. The transaction processor subroutine 42 furthermore includes program elements that may be necessary, such as an operating system, a database management system and "device drivers" for allowing the processor to interface with computer peripheral devices. Appropriate program elements are known to those skilled in the art, and need not be described in detail herein.

Various forms of computer readable media may be involved in carrying one or more sequences of one or more instructions (e.g., transaction processor subroutine 42) to the CPU 30 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the network server 12 (as well as other types of devices described herein) may obtain instructions in the form of a carrier wave.

According to one embodiment of the present invention, the instructions of the transaction processor subroutine 42 may be read into a main memory from another computer-readable medium, such as from a ROM. Execution of sequences of the instructions in transaction processor subroutine 42 causes the CPU 30 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

Note that while transaction processor subroutine 42 may be described herein as a software driven process, it can also be performed by a dedicated microprocessor, to enhance system performance.

Figure 3:
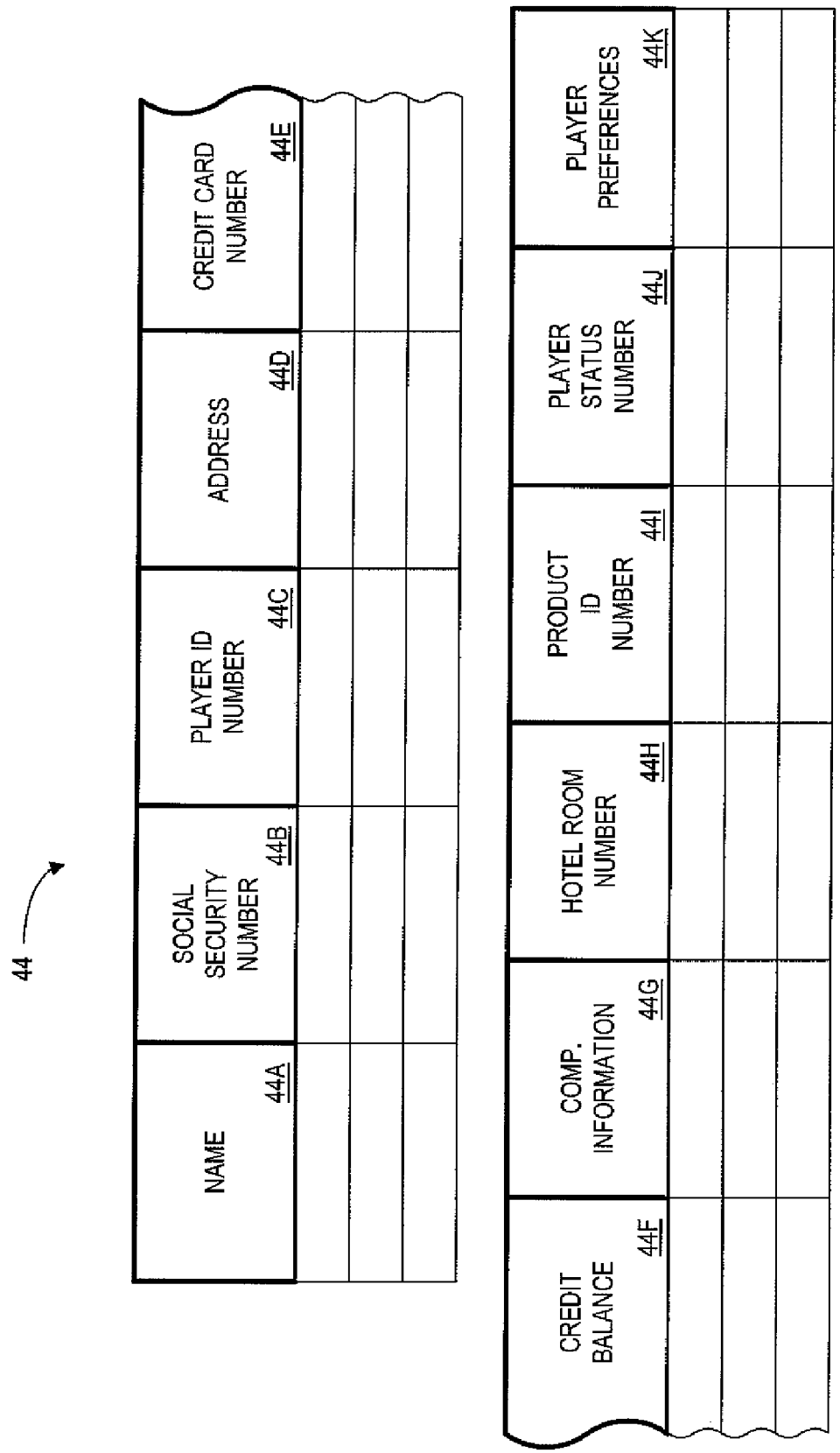
FIG. 3 is a schematic diagram of a player database consistent with one or more embodiments of the present invention.

The operation of transaction processor subroutine 42 will be described in detail below in conjunction with the flow diagram of FIG. 7. A schematic showing of example contents of a player database 44 consistent with some embodiments of the present invention is found in FIG. 3 and preferably includes the following data:

Name 44A;
Social Security Number 44B;
Player identification (ID) number 44C;
Address 44D;
Credit card number 44E;
Credit balance 44F;
Complimentary information 44G;
Hotel room number 44H;
Product ID number 44I;
Player status number 44J; and
Player preferences 44K.

Most of the contents of player database 44 are self-explanatory and require no further description. The complimentary information 44G is coded information indicating which services are to be provided to the player, free of charge or at a discount. The product ID number 44I identifies each product that the player has purchased, in a manner to be described below. Finally, the player status number 44J is a value assigned to the player and indicates a status level assigned by the gaming establishment to the player. For instance, the player may be a frequent player and entitled to certain premiums. Further, the player may have been disqualified from further play and this will be indicated by an assigned status number.

An indication of preferences 44K of a player may be stored in the player record of player database 44. For example, a player might prefer particular types of offers, such as those related to sports (e.g., sporting goods, tickets for sporting events). A player might prefer to receive offers with a particular frequency, or at particular times. Indications of such preferences 44K could be stored in player database 44.

In essence, player database 44 provides sufficient information to enable network server 12 to perform the invention hereof without requiring any further data from the player, other than a selection or non-selection of an offered product, service or offering.

An exemplary embodiment of product database 46 is illustrated, schematically, in FIG. 4 and includes a product ID number 46A; the price of the product 46B; a brief product description 46C; and the quantity of the product remaining 46D. In addition to merchandise, database 46 may include services that are to be offered to players (e.g., tax advice, medical and legal consulting). Further, for example, an offering may be included that will compensate the player for: switching phone service (e.g., AT&T to MCI); switching cable providers; switching Internet service providers; opening up a new credit card account; switching from one credit card to another; taking out a loan from a specified institution; agreeing to speak with a sales representative; or agreeing to attend a seminar.

The term "product" will be used herein to refer to all such offerings (e.g., merchandise-type products, services and other offerings).

The product ID number 46A may identify a unique product (e.g., show tickets for row J, seats 1-2). Alternatively, or in addition, the product ID number 46A may identify a group or class of products (e.g., sports apparel, or show tickets).

The price 46B in product database 46 may be used to indicate the price to a customer for a corresponding merchandise item or service, and may also be used to indicate the amount of compensation provided to a player in exchange for the player's acceptance of a condition of an offer (e.g., switching telephone service providers).

An exemplary embodiment of advertising database 48 consistent with some embodiments of the present invention is shown in FIG. 5 and includes an advertisement ID number 48A; an audio/video presentation of the advertisement 48B; criteria 48C; number-of-times displayed indicator 48D; a number-of-purchases 48E; and one or more product ID numbers 48F.

The criteria 48C in advertising database 48 is preferably a code (or codes) that identifies which set or subset of slot machines are to receive an advertisement or other type of offer. For example, certain advertisements could be shown to slot machines that require, for example, a dollar or more for each play. In another example, certain advertisements may only be shown to machines that are playable for less than a dollar per play.

In other examples, any slot machine which has been continuously played by a player for a predetermined period of time (or for a predetermined number of game plays) can be supplied with particular advertisements. Advertisements for certain products of a certain value or price level can be targeted to a player in accordance with the player's assigned status number 44J. In another example, an advertisement could be transmitted to a slot machine whose output data indicates a player win. In yet another example, an advertisement could be transmitted to a slot machine whose output data indicates a player loss. In yet another example, a player database of the present invention may track statistics associated with a player such as coin-in, theoretical win, actual lifetime win/loss as known in the art. Accordingly, an advertisement may be transmitted to a slot machine based on such data (e.g., when a theoretical win value reaches a predetermined threshold).

According to other various embodiments, information about product inventory may be used by network server 12 in determining to send a particular advertising message to a slot machine. For example, a particular advertisement may be sent to a slot machine if the quantity remaining of a corresponding product is above a predetermined threshold. This would assist the casino in managing the product inventory. According to another embodiment, criteria 48C might specify that an advertisement is to be transmitted based on player preferences 44K (or other information about the player). For example, a sports-related advertisement might only be sent to machines with players who have indicated a preference for such offers.

The number-of-times displayed 48D and number-of-purchases 48E in advertising database 48 are used for later analysis of the effectiveness of the advertisement. The number-of-times displayed 48D and number-of-purchases 48E may be used in determining which advertisements to provide. For example, "popular" offers (e.g., offers having a higher number-of-purchases 48E than others) may be determined and output to players accordingly.

The one or more product ID numbers 48F correspond to the merchandise, services, and/or offerings being offered in the advertisement. A particular product may be associated with more than one advertisement. Also, a particular advertisement may offer more than one product to the player.

While the audio/video presentation of the advertisement is shown as being contained within advertising database 48, a value inserted into database 48 may also be a pointer to a further on-line video or audio player that is responsive to the pointer and other control data to provide a desired presentation.

Figure 6:
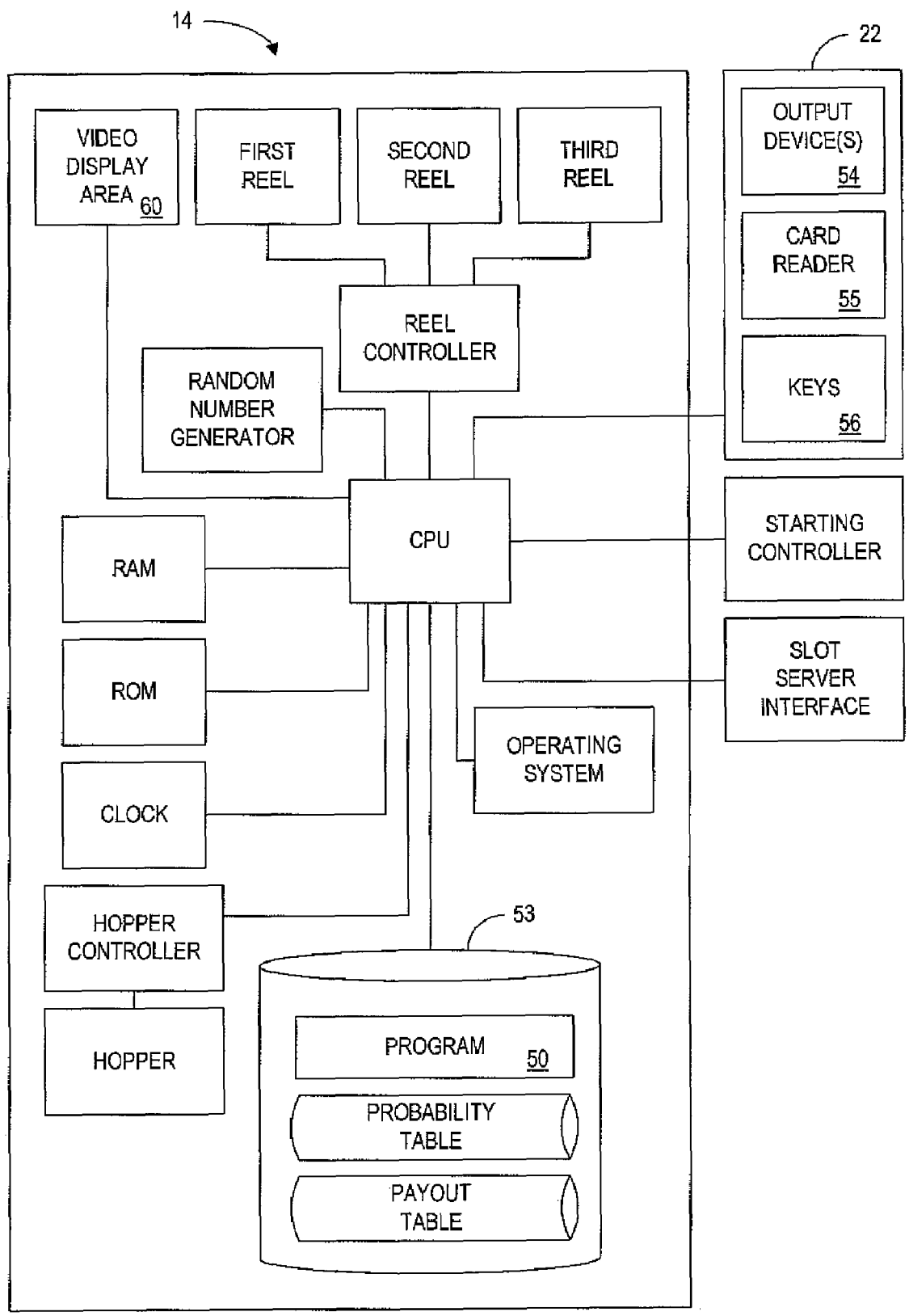
FIG. 6 is a high-level block diagram of a slot machine consistent with one or more embodiments of the present invention.

Turning now to FIG. 6, a block diagram of an exemplary slot machine 14 consistent with some embodiments of the present invention is illustrated. Slot machine 14 includes an interactive display 22 and a program 50 contained within a resident data storage device 53. Interactive display device 22 includes output device(s) 54, a card reader 55 and keys 56 ("soft" or "hard") for enabling a player to input data into slot machine 14. Output device(s) 54 may comprise one or more of, for example, a display area, a touch screen (e.g., also capable of receiving input from a player), an audio output device (e.g., a speaker), a printer (e.g., for providing a voucher to a player), etc. A video display area 60 may also be present in slot machine 14, but may not be accessible to external control by network server 12. If this is the case, output device(s) 54 is/are used to display or otherwise provide downloaded product/product purchase information and further messages to the player. Otherwise, the provision of output device(s) 54 may not be necessary. Slot machine 14 may be configured with any of various other components and/or modules known to those skilled in the art, as deemed appropriate for a particular application. For example, each of the remaining sub-modules depicted within the exemplary slot machine 14 is known to those skilled in the art and requires no detailed discussion (e.g., various input devices such as buttons, handles or levers; various output devices; etc.).

Although the data storage device 53 is preferably resident, the CPU and the data storage device may each be, for example: (i) located entirely within a single computer or other device; or (ii) connected to each other by a remote communication medium, such as a serial port cable, telephone line or radio frequency transceiver. In one embodiment, the slot machine 14 may comprise one or more devices that are connected to a remote server computer for maintaining databases.

The data storage device 53 stores a program 50 for controlling the CPU. The CPU performs instructions of the program 50, and thereby operates in accordance with the present invention, and particularly in accordance with the methods described in detail herein. The program 50 may be stored in a compressed, uncompiled and/or encrypted format. The program 50 furthermore includes program elements that may be necessary, such as an operating system, a database management system and "device drivers" for allowing the processor to interface with computer peripheral devices. Appropriate program elements are known to those skilled in the art, and need not be described in detail herein.

According to one embodiment of the present invention, the instructions of the program 50 may be read into a main memory from another computer-readable medium, such as from a ROM. Execution of sequences of the instructions in program 50 causes the CPU to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

In other embodiments, aspects of the present invention may be practiced by replacing and/or augmenting one or more components (e.g., hardware and/or software components) of an existing slot machine. Thus, in one or more embodiments, the invention may be applied as a retrofit or upgrade to existing slot machines currently available for play (e.g., within a casino).

For example, a memory (e.g., computer chip) of a slot machine may be replaced or added, the replacement or additional memory storing a program (e.g., program 50) for instructing the processor of the slot machine to operate in accordance with one or more embodiments of the present invention. In some embodiments, a module may be made available for purchase to various casino operators. The module, which may comprise various hardware and software (e.g., an EEPROM storing software instructions), may be installed in an existing slot machine (e.g., a video-reel slot machine, a video poker machine, etc.), such that when the module is installed, players of the device may elect (i) to play a game offered by the slot machine that does not incorporate aspects of the present invention (e.g., such that offers are not presented to players), or (ii) to play a game offered by the slot machine in a manner that utilizes aspects of the present invention (e.g., such that offers are presented to players).

When a product/product purchase advertising message is received from network server 12, program 50 enables display or other output of the message by output device(s) 54. For example, program 50 may comprise a control procedure for controlling display (and/or other output) of information to a player. Further, program 50 preferably controls the operation of interactive display device 22, including card reader 55 and keys 56. When a player inputs a selection or other data via keys 56, such an entry is recognized by program 50, which causes the resident CPU in slot machine 14 to configure the entered data for transmission over bus system 20 (via the slot/network sever interface) to network server 12.

Figure 7:
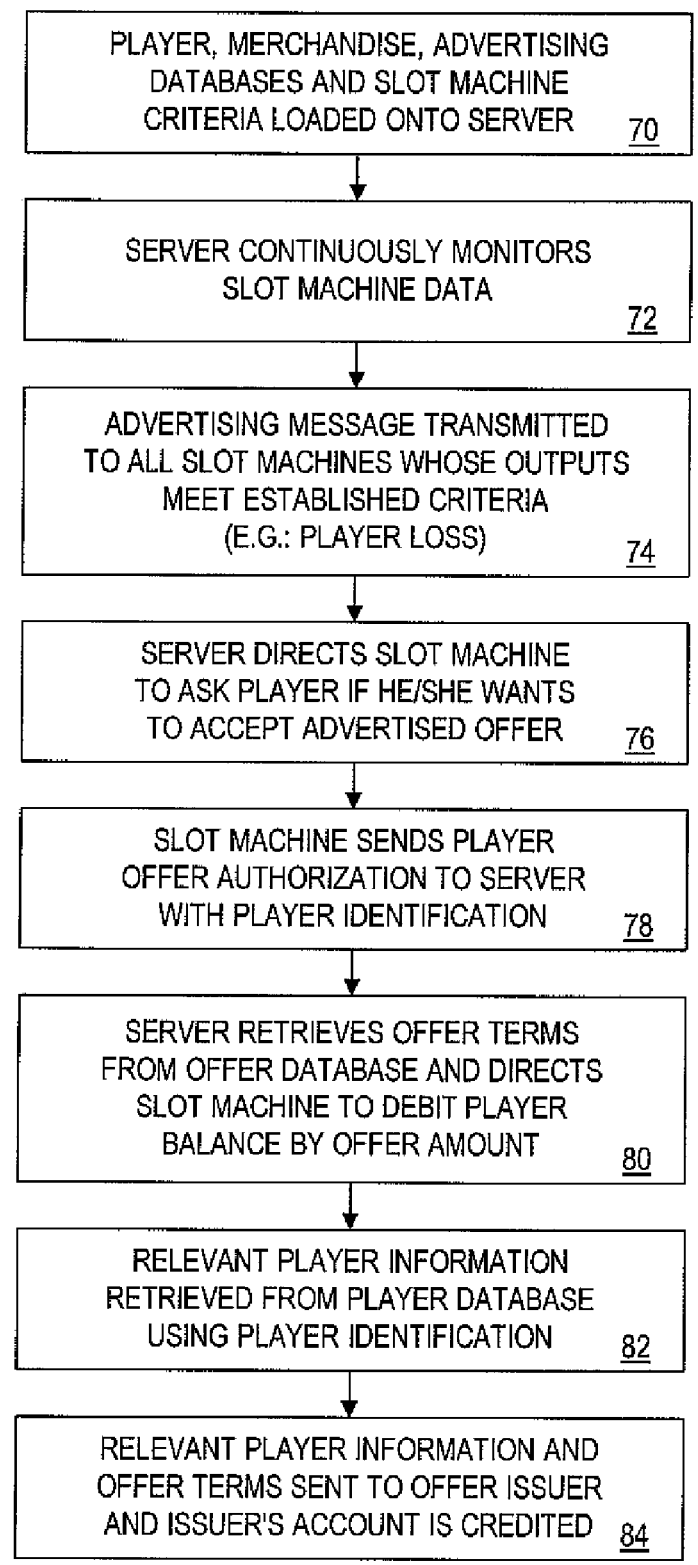
FIG. 7 illustrates a logic flow diagram of an advertising process consistent with one or more embodiments of the present invention.

Turning now to FIG. 7, a process in accordance with some embodiments of the present invention will be described. Initially, network server 12 has had loaded and stored therein player database 44, product database 46, advertising database 48, offer status database 100, and criteria (box 70). Such stored databases and resident transaction processor routine 42 (FIG. 2) enable network sever 12 to selectively provide advertising messages to individual slot machines 14, 16, and 18. Alternatively, the stored databases and criteria are not stored in network server 12, but are stored in a medium in communication with network server 12.

Thereafter, network server 12 monitors and analyzes data that is fed from the connected slot machines (box 72). Such data may include information about a respective slot machine (e.g., denomination of slot machine), information about a respective player (e.g., player identifier) and/or information about respective game play (e.g., outcome of a play).

After receiving the slot machine data, network server 12 transmits product advertisement/pricing data to any one or more slot machines whose output data meets one or more established criteria (box 74).

For instance, a certain product advertisement may be provided to all slot machines that require one dollar or more per play. Further, any slot machine that has been continuously played by a player for a predetermined period of time can be supplied with a subset of advertisements. According to other various embodiments, advertisements of certain price level products/services can be targeted to a player in accordance with the player's assigned status number 44J. Such status number 44J is input to the slot machine by insertion of the user's card in to the card reader at the start of play. For example, the player may have a status number that indicates she is a guest of the casino hotel, or is a frequent slot machine player. Such status number 44J is input to the slot machine by insertion of the user's card in to the card reader at the start of play. According to other embodiments, certain advertisements can be targeted to a player in accordance with the player's preferences 44K. According to another example, an advertisement is transmitted to a slot machine which indicates to network sever 12 that a player win has occurred which requires a monetary payout to the player. In another example, an advertisement could be transmitted to any slot machines whose output data meets the criterion of a player loss. In yet another example, advertisements may be transmitted to slot machines being played by players who have generated a threshold amount of theoretical win.

If one or more criteria are met, network server 12 will send a message to the respective slot machine, which asks if the player wishes to purchase advertised goods for a displayed price (box 76). Such a message may appear or otherwise be output to the player via display device(s) 54 within interactive display module 22.

According to an alternative embodiment, more than one message may be sent to the respective slot machine (e.g., simultaneously or at separate times).

If the player sends a purchase confirmation to network sever 12 (box 78), it is also preferably accompanied by a player ID number that is stored both locally in slot machine 14 and in network server 12. This may enable a confirmation message to be transmitted to or otherwise provided via output device(s) 54. Such information may, for example, provide the name of the purchase, for confirmation purposes.

Thereafter, network server 12 retrieves the price of the product 46B from product database 46 and, if a win occurred, directs slot machine 14 to pay out the amount of the win, less the purchase price of the product. If the purchase price is greater than the amount of the payout, the player's credit balance is debited by the amount of the purchase. Further, the credit balance 44F maintained by network sever 12 is likewise debited (box 80). Thereafter, the player address 44D is retrieved from player database 44, based upon the player ID number (box 82). The player address 44D and purchase information are then sent to a dispatching function where the goods are shipped to the player and network server 12 then credits the manufacturer's account with a payment amount (box 84).

The latter action assumes that the manufacturer's account is maintained locally. The system may also be configured to initiate a transfer of funds to the manufacturer's account in a banking establishment via a wire transfer.

If the player sends a purchase confirmation to network server 12 evidencing acceptance of a product "switch" offer (e.g., from one telephone supplier to another), server 12 retrieves the amount to be credited to the player, credits the player's account and so notifies the slot machine. If the account is also maintained at the slot machine, it too is credited. The credited amount may be tagged so that it is only useful for play of the slot machine, or it can actually be paid out, to be later billed to the player if the player reneges.

While not shown in FIG. 7, further control features can be implemented under control of transaction processor routine 42. For instance, the player, by agreeing to have an advertisement shown at his/her slot machine, can be targeted to enjoy incremental benefits such as higher payouts, or free slot pulls. Transaction processor routine 42 can also enable players to disable the advertising message, should they so desire. Further, a corporate sponsor can arrange for extra prizes to be available to be awarded to players with certain pre-specified status numbers (e.g., employees) in the player database.

Finally, the product to be advertised at the time of a monetary payout can be chosen in conformance with the amount of the payout so as to enable the amount of the payout to at least cover the cost of the purchase.

Thus, according to various embodiments of the present invention, advertising can be provided to gaming devices and a player is allowed to respond to and benefit from such advertising messages. Services may be provided to players, based upon intelligent conclusions regarding characteristics of the player and a matching thereof to offered products and services. According to various embodiments of the present invention, advertising, product, and/or pricing information may be provided to slot machine players, wherein the information is intelligently chosen based upon various criteria, such as conditions at the slot machine, and/or characteristics of the player.

According to various alternative embodiments, information about product inventory may be used by network server 12 in determining to send a particular advertising message to a slot machine. For example, a particular advertisement may be sent to a slot machine if the quantity remaining of a corresponding product is above a predetermined threshold. This would assist the casino in managing the product inventory. Further, it should be noted that in embodiments wherein an offer comprises an offer for a service (e.g., such as a spa visit or buffet admission), the availability of the service may be considered (e.g., the current utilization level of the spa or buffet).

According to various alternative embodiments, advertisements may be analyzed based on their effectiveness with a particular player or with all players to whom they have been provided. For example, the number-of-times displayed 48D and number-of-purchases 48E in advertising database 48 may be used in determining which advertisements are more effective. Advertising messages may thus be transmitted (box 74) based on an assessment of their effectiveness.

In still further embodiments, offers may be transmitted to players based on various other criteria, including but not limited to (i) time and/or date considerations (e.g., various services may only be offered during certain time periods), (ii) casino capacity or utilization considerations (e.g., if it is determined that 15% or less of all slot machines are currently being played, various offers may be output), and/or (iii) any other rules or considerations deemed practicable or appropriate by a casino operator.

Figure 8A:
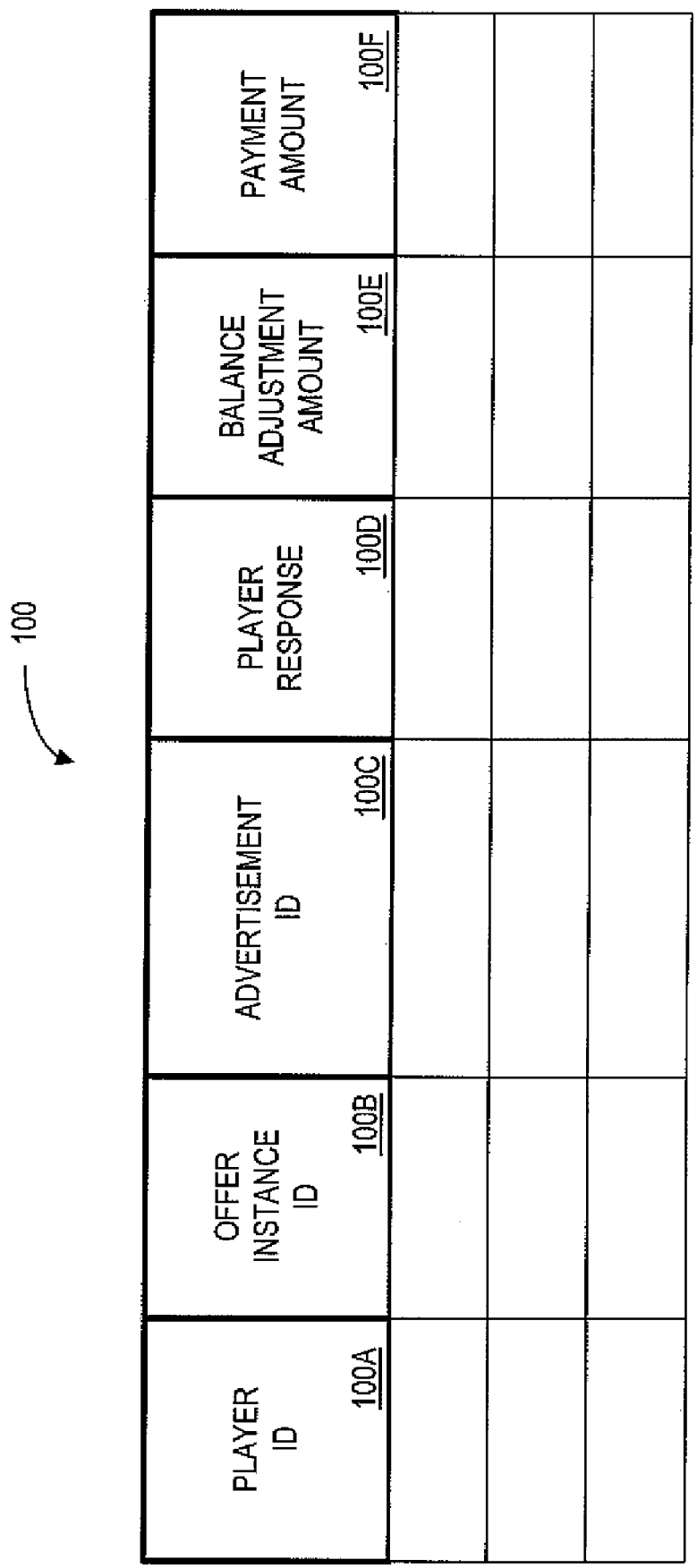
FIG. 8A is a schematic diagram of an offer status database consistent with one or more embodiments of the present invention.

A portion of an exemplary offer status database 100 is shown in FIG. 8A, and includes a player identifier 100A; offer instance identifier 100B; advertisement identifier 100C; player response 100D; balance adjustment amount 100E; and payment amount 100F. Offer status database 100 preferably is used to track all offers made to all players, but may be limited to a subset of players and/or offers.

Player identifier 100A identifies a player to whom an advertisement has been provided, and preferably corresponds to player ID number 44C in player database 44. Offer instance identifier 100B identifies an instance that an advertisement identified by advertisement identifier 100C was provided to the player identified by player identifier 100A. Player response 100D preferably contains an indication of whether the player accepted the offer in the advertisement, refused the offer, or deferred the offer until a later time. Player response 100D may also indicate whether the player expressed a preference (or dislike) for the advertisement, and whether the player desires to receive similar advertisements. Balance adjustment amount 100E contains the amount by which the player's balance is credited or debited, depending on the type of offer. For example, if the advertisement is for a switch offer, balance adjustment amount 100E preferably will indicate the amount by which the player's balance will be credited. If the advertisement is for a merchandise item, balance adjustment amount 100E preferably indicates the amount by which the player's balance will be debited. Payment amount 100F preferably stores the amount that the casino receives if the player accepts the offer (e.g., from a third-party merchant who sponsored a switch offer) or the amount that the casino pays to a sponsor of an offer (e.g., a manufacturer of a purchased product).

Alternative (or supplemental) offer status database 120 is shown in FIG. 8B, and is preferably used to track all offers made to a particular player. Alternative offer status database 120 may be used in addition to, or as an alternative to, offer status database 100. Offer instance identifier 120A, advertisement identifier 120B, player response 120C, balance adjustment amount 120E, and payment amount 120F correspond to data in offer status database 100 described above. Alternative offer status database 120 also preferably includes a response time 120D, which indicates a date and/or time at which the player responded to the advertisement.

According to various embodiments, information such as that contained in offer status database 100 and alternative offer status database 120 may be used to determine which advertisement(s) to send to a particular slot machine(s). For example, for a particular player, network server 12 may determine that the player tends to refuse offers provided during a particular time period. In another example, network server 12 may determine that the player tends to accept certain types of offers. For instance, a player might respond more favorably to audio and video content than just video content, or might respond more favorably to sports-related advertisements.

According to various embodiments of the present invention, data corresponding to the information of one or more of transaction processor routine 42, player database 44, merchandise database 46, advertising database 48, and offer status database 100, are stored in a memory (e.g., resident data storage device 53) of representative slot machine 14. Thus, the slot machine 14 may perform some or all of the functions of network server 12. For example, a transaction processor routine (not shown) at slot machine 14 may monitor the slot machine data, determine an appropriate advertising message from an advertising database (not shown) at the slot machine 14, and send offer authorization to network server 12, which then retrieves relevant player information from player database 44 and concludes the transaction as described above. Of course, other combinations of functions and distributions of information among server and slot machine(s) are possible. Any information stored at the slot machine 14 may be periodically refreshed, for example, by the network server 12. Similarly, information stored at the slot machine 14 may be used to periodically refresh, for example, information stored at the network server 12.

According to various embodiments of the present invention, a network server provides control functions for gambling devices of the type that provide intermittent monetary payments to players at a point-of-play. The point-of-play includes an interactive display device for displaying messages to the player and for receiving player responses, which are then transmitted to a network server. Memory at the network server stores product and product purchase information as well as customer profile data. The network server causes transmission of product and product purchase information to the interactive display device and monitors each of the gambling devices to detect an occurrence of a player win that requires a monetary payout. The network server is responsive to the detection of the player win, to an entry from the player that indicates the purchase of a product (as offered by a locally displayed advertisement), and to pay out the amount of the win less the purchase price of the product. The network server is also controlled to display selected subsets of product and product purchase information in accord with player characteristic data that is input by the player at the gambling device.

According to some embodiments of the present invention, output device(s) 54 maybe configured to output or otherwise provide a record to a player upon acceptance of one or more product purchase offer(s) (e.g., on a printed receipt, on a card storing an indication of an offer and/or offer acceptance). For example, a player satisfying a certain condition (e.g. rate of play, win amount, loss amount, etc.) may qualify to receive an offer to purchase a product, as described herein. Upon the player accepting the offer, output device(s) 54 may operate to provide a physical record, such as a printed voucher. In another example, output device(s) 54 may comprise a device configured to update a player tracking card, smart card, or other type of card (e.g., containing a magnetic stripe) with information about the offer (e.g., terms and conditions, product to be provided to the player) and/or the player's acceptance of the offer. In one embodiment, the player may present and/or redeem a card, printed receipt, or other type of voucher at an appropriate location (e.g., a restaurant or shop located on the casino property) in order to obtain a purchased product or benefit. For example, such a printed voucher or other document may comprise an identifier associated with a particular offer (e.g., a numeric identifier that may be read by humans, a machine-readable barcode encoding a numeric identifier, etc.). The player may then be allowed to claim the product or service in question by providing the identifier (e.g., by handing the voucher to a casino representative). In some embodiments, a database may be used to track the issuance, redemption and/or expiration of such product offers, such that players may not redeem products they have already claimed or offers that have expired. For example, a merchant receiving such an identifier from a player (e.g., on a printed receipt) may be able to access such a database (e.g., using a terminal in communication with the network server 12 via a communications network)

According to some embodiments, a voucher may include terms, conditions or general instructions required of a player in order to obtain the purchased product. For example, a printed voucher may include explanatory text that describes one or more times of day during which the player may obtain the purchased product from a particular merchant. In accordance with some embodiments, terms and conditions describing when a player may obtain a product or service could be useful in allowing a provider of the product (e.g., a golf course, a restaurant) to selectively make the product available during periods when utilization is typically low (e.g., rounds of golf after 4:00 PM, meals before 6:00 PM, etc.). By restricting when such products may be obtained, such terms may also allow a merchant to effectively discount services and products offered during such "off-peak" periods.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scoped of the appended claims.

We claim:

1. A method comprising:
   determining a win of a player at a gaming device;
   providing, based at least in part on the determining of the win an offer for the player to purchase a product;
   determining an acceptance of the offer by the player; and
   adjusting, based at least on part on the determining of the acceptance of the offer by the player, a monetary balance associated with the player;

wherein, the determining and adjusting steps are done by the gaming device or a server in communication with the gaming device.

2. The method of claim 1, further comprising:
determining the offer.

3. The method of claim 2, wherein the determining of the offer comprises:
determining a preference associated with the player; and
selecting, based on the determining of the preference associated with the player, the offer from a plurality of available offers.

4. The method of claim 1, further comprising:
determining a subset of a plurality of gaming devices via which the offer should be displayed; and
determining that the gaming device is one of the subset of gaming devices.

5. The method of claim 4, wherein the providing is further based at least in part on the determining that the gaming device is one of the subset of gaming devices.

6. The method of claim 1, wherein the determining of the acceptance comprises:
receiving, from the player, an indication of an acceptance of the offer.

7. The method of claim 6, wherein the adjusting comprises:
selling the product to the player for a price.

8. The method of claim 7, wherein the selling comprises:
charging the price to a credit card associated with the player.

9. The method of claim 7, wherein the selling comprises:
debiting the price from a debit account associated with the player.

10. The method of claim 7, wherein the selling comprises:
charging the price to a hotel room associated with the player.

11. The method of claim 7, wherein the selling comprises:
debiting the price from a balance of complimentary points associated with the player.

12. The method of claim 2, wherein the determining of the offer is based at least in part on an available inventory of the product.

13. The method of claim 2, wherein the determining of the offer is based at least in part on a history of acceptance of the offer.

14. The method of claim 2, wherein the determining of the offer is based at least in part on a history of acceptance of offers by the player.

15. The method of claim 2, wherein the determining of the offer is based at least in part on a status of the player.

16. The method of claim 2, wherein the determining of the offer is based at least in part on a statistic associated with the player.

17. The method of claim 2, wherein the product comprises a service and wherein the determining of the offer is based at least in part on a current level of utilization of the service.

18. The method of claim 2, wherein the offer comprises one of a first advertisement for the product and a second advertisement for the product, wherein the first and second advertisements are different.

19. A computer-readable medium storing instructions configured to direct a processor to perform the method of:
determining a win of a player at a gaming device;
providing, based at least in part on the determining of the win, an offer for the player to purchase a product;
determining an acceptance of the offer by the player; and
adjusting, based at least on part on the determining of the acceptance of the offer by the player, a monetary balance associated with the player.

20. An apparatus comprising:
a processor; and
a computer-readable medium in communication with the processor and storing instructions configured to direct a processor to:
determine a win of a player at a gaming device;
provide, based at least in part on the determining of the win, an offer for the player to purchase a product;
determine an acceptance of the offer by the player; and
adjust, based at least on part on the determining of the acceptance of the offer by the player, a monetary balance associated with the player.

* * * * *

UNITED STATES PATENT AND TRADEMARK OFFICE
CERTIFICATE OF CORRECTION

| | | |
|---|---|---|
| PATENT NO. | : 7,658,674 B2 | Page 1 of 1 |
| APPLICATION NO. | : 11/423267 | |
| DATED | : February 9, 2010 | |
| INVENTOR(S) | : Walker et al. | |

It is certified that error appears in the above-identified patent and that said Letters Patent is hereby corrected as shown below:

IN THE CLAIMS:

In Claim 1, Column 12, line 65, replace "based at least on part on" with --based at least in part on--.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,658,674 B2 | Page 1 of 1 |
| APPLICATION NO. | : 11/423267 | |
| DATED | : February 9, 2010 | |
| INVENTOR(S) | : Walker et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 702 days.

Signed and Sealed this

Thirtieth Day of November, 2010

David J. Kappos
*Director of the United States Patent and Trademark Office*